(12) United States Patent
Dorr

(10) Patent No.: US 9,454,787 B1
(45) Date of Patent: Sep. 27, 2016

(54) SECURE MEMBERSHIP DATA SHARING SYSTEM AND ASSOCIATED METHODS

(71) Applicant: Stephen M. Dorr, Perkasie, PA (US)

(72) Inventor: Stephen M. Dorr, Perkasie, PA (US)

( * ) Notice: Subject to any disclaimer, the term of this patent is extended or adjusted under 35 U.S.C. 154(b) by 111 days.

(21) Appl. No.: 14/197,126

(22) Filed: Mar. 4, 2014

(51) Int. Cl.
*H04L 29/06* (2006.01)
*G06Q 50/00* (2012.01)

(52) U.S. Cl.
CPC .............. *G06Q 50/01* (2013.01); *H04L 63/08* (2013.01)

(58) Field of Classification Search
CPC ................................ G06Q 50/01; H04L 63/08
USPC ............................ 726/29; 715/753; 705/7.11
See application file for complete search history.

(56) References Cited

U.S. PATENT DOCUMENTS

| | | | | |
|---|---|---|---|---|
| 7,269,590 B2 * | 9/2007 | Hull | ....................... | G06Q 10/10 707/770 |
| 7,353,541 B1 * | 4/2008 | Ishibashi | .................. | G06F 21/10 348/E7.056 |
| 7,379,901 B1 * | 5/2008 | Philyaw | ................... | G06Q 20/10 705/17 |
| 2004/0054584 A1 * | 3/2004 | Boon | .................... | G06Q 20/382 705/14.26 |
| 2005/0105712 A1 * | 5/2005 | Williams | .............. | G10L 13/027 379/265.02 |
| 2007/0189708 A1 * | 8/2007 | Lerman | .................. | G11B 27/34 386/280 |
| 2008/0102792 A1 * | 5/2008 | Wang | ...................... | G06Q 30/06 455/410 |
| 2008/0165958 A1 * | 7/2008 | Matsushita | ............. | G06F 21/10 380/44 |
| 2008/0240447 A1 * | 10/2008 | Zhu | ...................... | H04L 63/0853 380/279 |
| 2008/0247731 A1 * | 10/2008 | Yamauchi | ............... | G06F 21/10 386/259 |

(Continued)

*Primary Examiner* — David García Cervetti
(74) *Attorney, Agent, or Firm* — Crose Law LLC; Bradley D. Crose

(57) ABSTRACT

A system for managing the utilization of personal proprietary information in social media is disclosed. In various embodiments, the system provides an interface between databases that facilitates the processing and sharing of private information that allows access to personal proprietary information used to confirm or disaffirm the personal vitals in multiple social media contexts. This system allows a user to access databases to access personal information for the user's individual use and individual purposes in social media. This system sets forth the ease and effectiveness of the interface allocable between multiple users, business as well as private individuals, within the parameters of the goal of the system to provide users with options for their specific and intended use. The system integrates databases to allow easy access and centralized storage of requested information for dissemination of user information in social media by every user in a membership capacity with other members.

20 Claims, 12 Drawing Sheets

(56) References Cited

U.S. PATENT DOCUMENTS

| | | | | |
|---|---|---|---|---|
| 2009/0019061 | A1* | 1/2009 | Scannell, Jr. | G06F 17/30905 |
| 2009/0119212 | A1* | 5/2009 | Liu | G06Q 20/10 705/44 |
| 2009/0144204 | A1* | 6/2009 | Hurry | G06Q 20/085 705/71 |
| 2009/0249448 | A1* | 10/2009 | Choi | H04L 63/0815 726/4 |
| 2009/0254971 | A1* | 10/2009 | Herz | G06Q 10/10 726/1 |
| 2009/0271321 | A1* | 10/2009 | Stafford | G06F 21/6245 705/71 |
| 2010/0005520 | A1* | 1/2010 | Abbot | G06Q 30/0255 726/6 |
| 2010/0046749 | A1* | 2/2010 | Hatano | H04L 9/088 380/44 |
| 2011/0194698 | A1* | 8/2011 | Asano | H04L 9/0643 380/282 |
| 2011/0218996 | A1* | 9/2011 | Jin | G06F 15/16 707/737 |
| 2011/0321132 | A1* | 12/2011 | Slingerland | H04N 21/4788 726/4 |
| 2012/0239417 | A1* | 9/2012 | Pourfallah | G06Q 30/0601 705/2 |
| 2013/0080218 | A1* | 3/2013 | Wildern, IV | G06F 17/30879 705/14.1 |
| 2013/0103584 | A1* | 4/2013 | Eichner | G06Q 20/02 705/44 |
| 2013/0125201 | A1* | 5/2013 | Sprague | G06F 21/6263 726/1 |
| 2013/0144785 | A1* | 6/2013 | Karpenko | G06Q 20/409 705/44 |
| 2013/0212177 | A1* | 8/2013 | Friedman | H04L 67/22 709/204 |
| 2013/0238979 | A1* | 9/2013 | Sayers, III | G06F 17/30867 715/234 |
| 2013/0268305 | A1* | 10/2013 | Glennon | H04L 51/32 705/5 |
| 2013/0297440 | A1* | 11/2013 | Bennett | G06Q 30/08 705/26.3 |
| 2014/0095324 | A1* | 4/2014 | Cabral | G06Q 30/08 705/14.71 |
| 2014/0250183 | A1* | 9/2014 | Unagami | H04M 3/5166 709/204 |
| 2014/0273940 | A1* | 9/2014 | Hyde | H04L 12/1478 455/406 |
| 2014/0291391 | A1* | 10/2014 | Kumar | G06Q 20/32 235/380 |
| 2014/0351154 | A1* | 11/2014 | Guillama | G06Q 50/01 705/319 |
| 2014/0365581 | A1* | 12/2014 | Kennon | G06Q 50/01 709/205 |
| 2014/0372485 | A1* | 12/2014 | Crumrine | G06F 17/30867 707/784 |
| 2015/0044987 | A1* | 2/2015 | Menon | H04M 15/705 455/406 |
| 2015/0052009 | A1* | 2/2015 | Ketchell, III | G06Q 30/0633 705/26.8 |
| 2015/0088603 | A1* | 3/2015 | Romero | G06Q 30/0201 705/7.29 |
| 2015/0092233 | A1* | 4/2015 | Park | G06F 3/1288 358/1.15 |
| 2015/0127535 | A1* | 5/2015 | Chavarria | G06Q 20/409 705/44 |
| 2015/0149353 | A1* | 5/2015 | Linden | G06Q 20/28 705/41 |
| 2015/0161610 | A1* | 6/2015 | Sahadevan | G06Q 20/4016 705/44 |

* cited by examiner

SECURE MEMBERSHIP DATA SHARING SYSTEM AND ASSOCIATED METHODS

FIELD OF THE INVENTION

The technology described herein relates generally to a system for managing the utilization of personal proprietary information in social media. Particularly, the technology described herein relates to a system that provides an interface between databases that facilitates the processing and sharing of private information. More particularly, the technology described herein relates to the storage of proprietary information within databases containing personal and private information available for voluntary release by every user in a membership capacity with other members.

BACKGROUND OF THE INVENTION

Disclosure documents voluntarily prepared, acknowledged, and submitted for business and personal utility have long been known in the background art and are widely used. By way of example, information voluntarily provided to enable vetting procedures as a condition to employment in specific types of work in government and commercial industry is supported by both private and public sectors for use in specific circumstances. Though investigatory procedures have been applied in the past as an approach to protect the initiator of the request with considerable popularity as well as recognized as commercially viable to insure security, there is no doubt there has been a continuing need for the additional utility of self-disclosure in a social context.

Any discussion of the prior art throughout the specification of the inventive design should not be considered as an admission that such prior art is widely known or forms part of the common knowledge in the field. Current vetting procedures while used widely do not utilize initiate, release and capture technology in a social context today. Known systems and processes include many deficiencies and limitations.

The foregoing information reflects the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's technology disclosed herein.

BRIEF SUMMARY OF THE INVENTION

In various exemplary embodiments, the technology described herein provides a system for managing the utilization and exchange of personal proprietary information in social media. The system provides an interface between databases that facilitates the processing and sharing of private information. The system stores proprietary information within databases containing personal and private information available for voluntary release by every user in a membership capacity with other members.

In one exemplary embodiment, the technology described herein provides a method for implementing a system for managing the utilization of personal proprietary information in social media. The method includes: providing a user interface through which members access the system across a network and for managing the utilization of personal proprietary information in social media; providing a secure database server consisting of a plurality of database modules for the storage of proprietary information within the databases modules containing personal and private information available for voluntary release by every user in a membership capacity with other members; facilitating a secure transfer of personal proprietary information in social media between an initiating member and a receiving member; executing, by the initiating member, a request to release and send a data report containing personal and private information of the initiating member to the receiving member; generating a member access code; assigning the member access code to a specific user data report; releasing the member access code assigned to the specific user data report and transmitting the member access code to the initiating member; executing an option of the receiving member to retrieve and capture the specific user data report of the initiating member; confirming the authenticity of the receiving member, if the receiving member so elects to retrieve and capture the specific user data report of the initiating member; executing, if the authenticity of the receiving member is confirmed, the option of the receiving member to retrieve and capture the specific user data report of the initiating member; pairing the specific user data report with the member access code; transmitting to the receiving member the member access code to the specific user data report with instructions to enter the member access code and a user name of the receiving member into the user interface; processing the request from the receiving member to retrieve and capture the specific user data report of the initiating member; and transmitting to the receiving member the specific user data report from the initiating member.

In at least one embodiment, the method further includes: locating a personal data file of the initiating member from a module within the secure database server; and authenticating a first member status of the initiating member.

In at least one embodiment, the method also includes: locating a personal data file of the receiving member from a module within the secure database server; and authenticating a second member status the receiving member.

In at least one embodiment, the method further includes displaying to the initiating member a plurality of options through the user interface regarding the secure the transfer of personal proprietary information to the receiving member.

In at least one embodiment, the method also includes: displaying to the receiving member a plurality of options through the user interface regarding the secure receipt of personal proprietary information from the initiating member.

In at least one embodiment, the method further includes: validating member payment information for the initiating member; determining if payment is by a new member or a renewing existing member; and updating the membership database.

In at least one embodiment, the method also includes: validating member payment information for the receiving member; determining if payment is by a new member or a renewing existing member; and updating the membership database.

In at least one embodiment, the method further includes: generating a progressive code access key, the progressive code access key defined by the progressive code access key database module of the secure database server; and assigning the generated progressive code access key to the specific user data report.

In another exemplary embodiment, the technology described herein provides a computer readable storage medium encoded with programming for implementing a system for managing the utilization of personal proprietary information in social media. The computer readable storage medium encoded with programming configured to: provide a user interface through which members access the system across a network and for managing the utilization of personal proprietary information in social media; provide a secure database server consisting of a plurality of database modules for the storage of proprietary information within the databases modules containing personal and private information available for voluntary release by every user in a membership capacity with other members; facilitate a secure transfer of personal proprietary information in social media between an initiating member and a receiving member; execute, by the initiating member, a request to release and send a data report containing personal and private information of the initiating member to the receiving member; generate a member access code; assign the member access code to a specific user data report; release the member access code assigned to the specific user data report and transmitting the member access code to the initiating member; execute an option of the receiving member to retrieve and capture the specific user data report of the initiating member; confirm the authenticity of the receiving member, if the receiving member so elects to retrieve and capture the specific user data report of the initiating member; execute, if the authenticity of the receiving member is confirmed, the option of the receiving member to retrieve and capture the specific user data report of the initiating member; pair the specific user data report with the member access code; transmit to the receiving member the member access code to the specific user data report with instructions to enter the member access code and a user name of the receiving member into the user interface; process the request from the receiving member to retrieve and capture the specific user data report of the initiating member; and transmit to the receiving member the specific user data report from the initiating member.

In at least one embodiment, the programming in the computer readable storage medium is further configured to: locate a personal data file of the initiating member from a module within the secure database server; and authenticate a first member status of the initiating member.

In at least one embodiment, the programming in the computer readable storage medium is also configured to: locate a personal data file of the receiving member from a module within the secure database server; and authenticate a second member status the receiving member.

In at least one embodiment, the programming in the computer readable storage medium is further configured to display to the initiating member a plurality of options through the user interface regarding the secure the transfer of personal proprietary information to the receiving member.

In at least one embodiment, the programming in the computer readable storage medium is also configured display to the receiving member a plurality of options through the user interface regarding the secure receipt of personal proprietary information from the initiating member.

In at least one embodiment, the programming in the computer readable storage medium is further configured to: validate member payment information for the initiating member; determine if payment is by a new member or a renewing existing member; and update the membership database.

In at least one embodiment, the programming in the computer readable storage medium is also configured to: validate member payment information for the receiving member; determine if payment is by a new member or a renewing existing member; and update the membership database.

In at least one embodiment, the programming in the computer readable storage medium is further configured to: generate a progressive code access key, the progressive code access key defined by the progressive code access key database module of the secure database server; and assign the generated progressive code access key to the specific user data report.

In yet another exemplary embodiment, the technology described herein provides a system for implementing a system for managing the utilization of personal proprietary information in social media. The system includes: a user interface through which members access the system across a network and for managing the utilization of personal proprietary information in social media; a secure database server consisting of a plurality of database modules for the storage of proprietary information within the databases modules containing personal and private information available for voluntary release by every user in a membership capacity with other members; wherein the system is configured to: provide a user interface through which members access the system across a network and for managing the utilization of personal proprietary information in social media; provide a secure database server consisting of a plurality of database modules for the storage of proprietary information within the databases modules containing personal and private information available for voluntary release by every user in a membership capacity with other members; facilitate a secure transfer of personal proprietary information in social media between an initiating member and a receiving member; execute, by the initiating member, a request to release and send a data report containing personal and private information of the initiating member to the receiving member; generate a member access code; assign the member access code to a specific user data report; release the member access code assigned to the specific user data report and transmitting the member access code to the initiating member; execute an option of the receiving member to retrieve and capture the specific user data report of the initiating member; confirm the authenticity of the receiving member, if the receiving member so elects to retrieve and capture the specific user data report of the initiating member; execute, if the authenticity of the receiving member is confirmed, the option of the receiving member to retrieve and capture the specific user data report of the initiating member; pair the specific user data report with the member access code; transmit to the receiving member the member access code to the specific user data report with instructions to enter the member access code and a user name of the receiving member into the user interface; process the request from the receiving member to retrieve and capture the specific user data report of the initiating member; and transmit to the receiving member the specific user data report from the initiating member.

In at least one embodiment of the system, the system is further configured to: locate a personal data file of the initiating member from a module within the secure database server; authenticate a first member status of the initiating member; locate a personal data file of the receiving member from a module within the secure database server; and authenticate a second member status the receiving member.

In at least one embodiment of the system, the system is also configured to: display to the initiating member a plurality of options through the user interface regarding the secure the transfer of personal proprietary information to the receiving member; display to the receiving member a plurality of options through the user interface regarding the secure receipt of personal proprietary information from the initiating member; validate member payment information for the initiating member; determine if payment is by a new member or a renewing existing member; and update the membership database; validate member payment information for the receiving member; determine if payment is by a new member or a renewing existing member; and update the membership database.

In at least one embodiment of the system, the system is further configured to: generate a progressive code access key, the progressive code access key defined by the progressive code access key database module of the secure database server; and assign the generated progressive code access key to the specific user data report.

Thus, the technology described herein includes a useful, novel, and unobvious system and associated methods for the secure membership data sharing in the social media field.

The benefits and, therefore, the first advantage of this technology disclosed herein is that an interface is provided that allows a member to input personal and proprietary information that can be validated through a secure platform and ultimately obtainable through one interface.

A second advantage of this technology disclosed herein is that the process exports the personal data of the member to an external platform that confirms the validity of the data and is thereafter exported back to the system, which configures a formal data report inclusive of the imported data, which can be retrieved by the member.

A third advantage of this technology disclosed herein is that members are automatically connected to the central processing page, after login, to immediately initiate the process of retrieval, review, or release of the member's personal data report.

A fourth advantage of this technology disclosed herein is that a member may initiate release of their personal data report to another member by the system process which releases a progressive code directly to that member through an email hyperlink allowing the member to enter their username and code authorizing the system to release the data report to the member.

A fifth advantage of this technology disclosed herein is that profile and personal data provided by the member are stored in a data server that can be immediately accessed to effect updates segregated and isolated from the personal data report of the member. The system process that embodies the databases facilitates the member's access to the databases.

The five advantages of this technology disclosed herein, set forth above, are provided by a system in accordance with this technology. The system of this technology includes processing units that maintain a programming database, a file database for member files, an email database, and a payment database.

A processing unit that is connected to processing or computer systems providing the databases provides an interface for accessing the databases is disclosed.

In accordance with the technology described herein, the interface may provide messages to a member that is generated by the system. The messages may include information and instructions to assist the member with option selections. To retrieve the messages, the member selects the message option. For example, the interface allows a member to retrieve and update their personal profile and background data pertaining to their background, which is stored in the database.

The interface also facilitates the ability of a member to initiate a message of the availability of the member data report to another member. In order to initiate this message, the initiating member selects the release and capture/retrieve option. The interface pre-processes the initiating member's request by confirming and validating the identity of the member through an access code exclusive to the member. Upon confirmation, the interface extracts the data report from the member file and issues a restricted code specific to the data report of the member. The code is progressive and is not reproduced. Upon issuance of the code, there occurs the simultaneous delivery of two messages: the first message, to the target member of the availability of the data report of the initiating member with instructions how to obtain the data report and the second message to the initiating member that a hyperlink containing the restricted code has been sent to the receiving member. The system process requires the receiving member to enter their user name and the access code in the initial message. The interface receives the information from the initiating member and then verifies the member information. Upon receipt and confirmation of the information, the system issues the personal data report of the initiating member to the receiving member.

In accordance with the technology disclosed herein, the interface restricts every member's access to any data and/or data report belonging to another member except in one circumstance. Only a member can initiate the release of their personal data report to another member. For example, the interface synchronizes the member access code with the data report requested by the initiating member. The interface then searches the file records in the database and matches the member request with the data report. The interface then generates a display with a message to the member confirming the availability of the data report from the request matching the search request.

The interface can begin the enrollment status of the member by requesting pre-payment. Once the pre-payment is approved, the membership account of the user is upgraded to an enrolled member. Simultaneously, the system process assigns an identifying access code to the member. The access code is unknown to the member and is utilized internally by the system to identify the member.

After the payment is approved, the interface auto-generates a two part message. The first message confirms that the background data of the member has been submitted to the secure platform (external) for review and confirmation. The second part of the message advises the member that their data report will be available for review within 24 to 72 hours. The interface then verifies the availability of the data report, validates the user information and retrieves the message to display to the member.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the technology is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the technology described herein. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
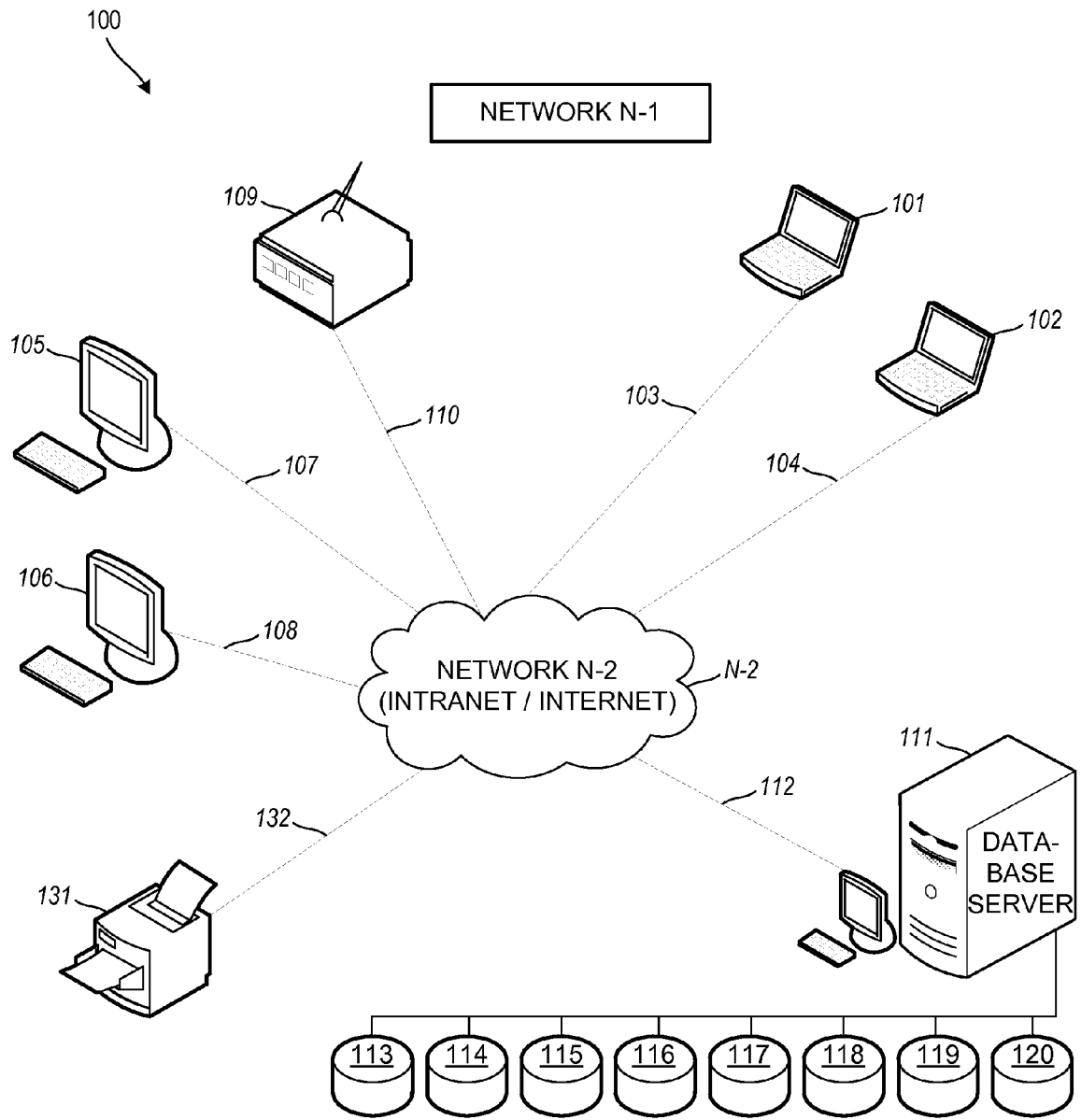
FIG. 1 is a schematic diagram illustrating a system architecture for implementing processes for secure membership data sharing, illustrating, in particular, the exchange of information between individuals within a system protected environment in the context of social media, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a system for managing the utilization and exchange of personal proprietary information in social media. The system provides an interface between databases that facilitates the processing and sharing of private information. The system stores proprietary information within databases containing personal and private information available for voluntary release by every user in a membership capacity with other members.

An interface is provided that may access the databases needed by each user to release proprietary information to a separate user and/or retrieve proprietary information voluntarily offered by a separate user within the context of social media. To the point, the availability of private information personal to a user that is channeled to another user upon request within the interface enables coordination of information sharing for a single or multiple users. The medium for the exchange of personal data may be facts and records secured by the system based upon the information provided by the user. The interface may be provided by software executed by a processing system at a personal computer or work station such as a desktop or laptop computer, or may be executed by a server that is communicating with a workstation over a network using a browser or other access software.

On the other hand, an open display of non-proprietary/non-personal information for example, in the context of social media, in which the content is made available by a provider with the authorization of a user provides random access to many users who are unknown to the authorizing user. Alternatively, the interface, in accordance with this technology, can permit the user to request, receive and release private data or to input personal data securely through the processing system.

When a user logs into the system, the interface provides a display that will provide the user with the options available by the interface to the user. Preferably, the display is a "Windows" type display with activation "buttons" that will provide the user with the available options as designated by the "buttons." The user can then select an option by "clicking" on the specific button that activates the option using a pointing device such as a mouse. Alternatively, the interface may have various drop-down menus that may be scrolled through to select an option. The interface is segmented in 5 steps and illustrated by FIGS. 1 through 11.

Referring now to the Figures, the details of the technology described herein are expressed through FIGS. 1 through 11, which identify the features of the system in accordance with the technology.

Referring now to FIG. 1, a schematic diagram 100 is shown, illustrating a system architecture for implementing processes for secure membership data sharing, illustrating, in particular, the exchange of information between individuals within a system protected environment in the context of social media.

FIG. 1 illustrates a network (N-1) that provides an exchange of information between individuals within a system-protected environment in the context of social media. Network N-1 includes a network, public or private, such as Internet or Intranet (N-2) that facilitates the connection between various processing systems to enable exchange of data between the processing systems. The processing systems are personal computers, routers, servers, or other devices that process digital data for these purposes.

In network N-1, laptop computers 101, 102 are connected to the Internet/Intranet N-2 via communication paths 103, 104. Personal computers 105, 106 are connected to the Internet/Intranet N-2 via communication paths 107, 108. One skilled in the art will recognize, upon reading this disclosure, that that paths 103, 104, 107 and 108 may be wireless, telephone, Ethernet lines or any other technique of connecting processing systems for communication. One skilled in the art will recognize, upon reading this disclosure, that personal computers 105, 106 and laptop computers 101, 102 also include, in various embodiments, smart phones, personal digital assistants, wireless communications devices, and so forth.

An information server 109 is connected to the Internet/Intranet N-2 via communications path 110. The information server 109 can operate as a router, as depicted in FIG. 1, or other processing device that facilitates data transfers between processing systems connected to the Internet/Intranet N-2.

A database server 111 is connected to the Internet/Intranet N-2 via communications path 112. A database server 111 is a processing system that maintains multiple databases that are accessed by the technology described herein. In Network N-1, database server 111 maintains a client database 113, personal identity number data base 114, data report data base 115, progressive code access key data base 116, email database 117, demographics data base 118, membership renewal database 119, and market vendor database 120.

Client database 113 is a database that stores client information of a proprietary nature in two separate files: personal contact information and business contact information. In both instances, the client will provide and verify facts regarding their contact information through the use of a form generated by the system. The information is provided by the client directly and subsequently verified by the system. The information provided by the client is used to populate updates to personal and/or business contact information as well as the data report application subsequent to completion of the client contact form.

Personal identity number data base 114 is a database that stores an internal client number for each user of the interface who becomes a member through payment of an annual fee. The personal identity number can be used by the system to synchronize and validate members' various uses under the system.

Data report data base 115 is a database that stores reports containing specific information provided by the client subsequently confirmed and validated and stored for the exclusive use at the direction of the client. The data report contains proprietary information that is secured and protected through the system which may only be released by a client at their sole discretion to another client.

Progressive code access key database 116 is a database that stores a software program that specifically functions as a progressive numbering utility that generates an alpha-numeric number triggered upon request of a client to release to another member or retrieve from another member a data report. The system auto-generates a sequentially progressive alpha-numeric number which attaches to every report each time a data report is requested by any client. Progressive code access keys are exclusive to each data report produced by the system and are never duplicated.

E-mail database 117 is an e-mail message system exclusive to clients for their personal use in exchanging information with other clients. The e-mail may include messages from the system relating to the availability of specific information relevant to another member or for other purposes in a social context.

Demographics database 118 stores information relating to states of member domiciles and comparative background of clients residing in different locales. Demographic information may come from other sources. The demographic information may be used for marketing purposes.

Membership renewal database 119 stores the specific date each client became a member. Prior to termination of the membership, the member is apprised of renewal opportunities by a date certain. The database stores information relating to special offers and referral discounts.

Market vendor database 120 stores advertising and market opportunities available to members as provided to the system through external links.

The member file database in accordance with this technology stores and maintains the operational efficiency of all databases referenced and inclusive of 113 through 120.

In Network N-1, printer 131 or other output device can be connected to Internet/Intranet N-2 via path 132. Printer 131 may print a display, screen or document as determined by a user. One skilled in the art will recognize, upon reading this disclosure, that path 132 may be a telephone line, an Ethernet line, or any other manner of connecting processing systems for communications.

Figure 2:
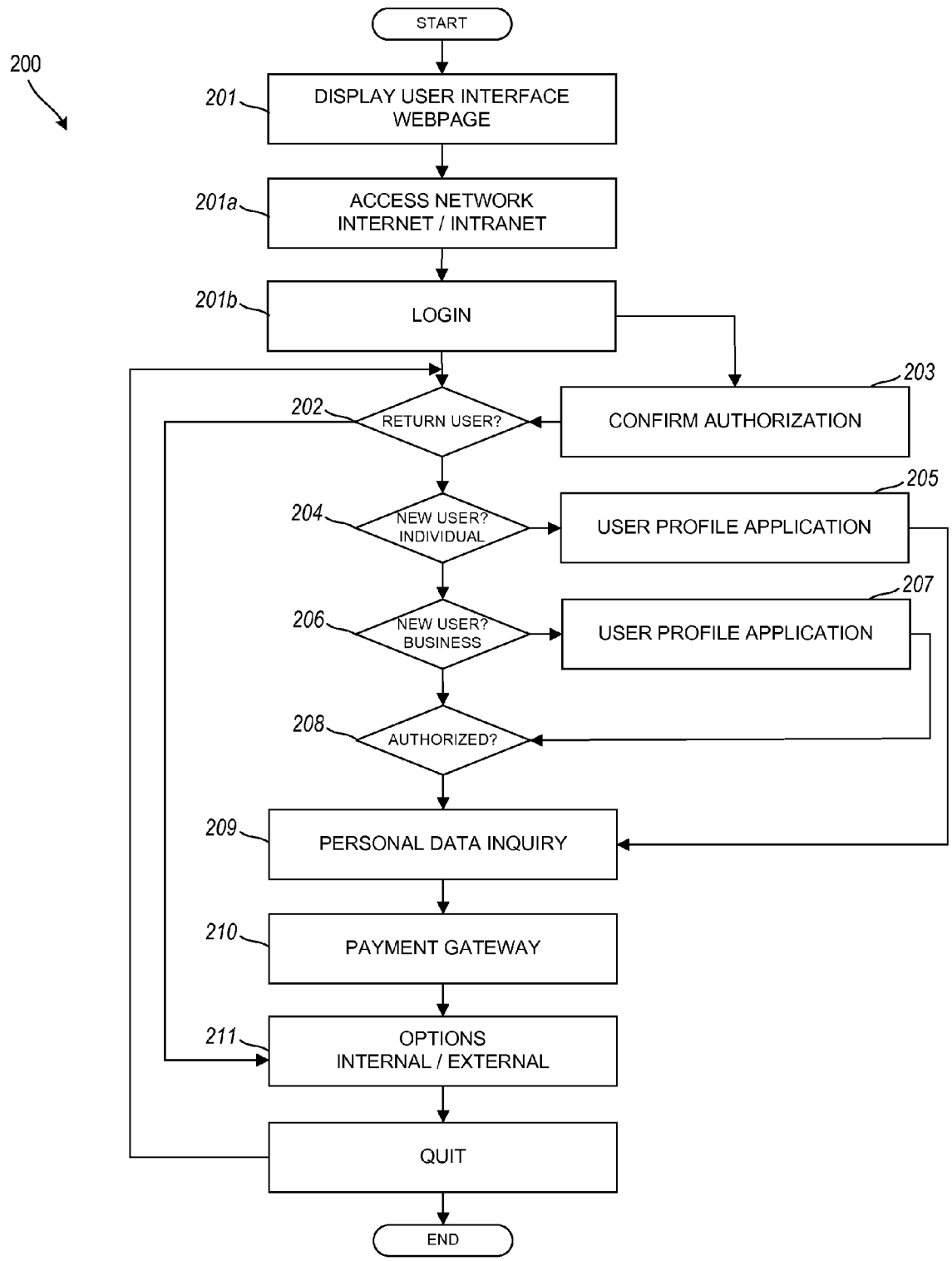
FIG. 2 is a flowchart diagram illustrating method steps for a secure membership data sharing system, illustrating, in particular, a website model that provides a user interface and navigation system, according to an embodiment of the technology described herein.

Referring now to FIG. 2, a flowchart diagram 200 is shown, illustrating method steps for a secure membership data sharing system, illustrating, in particular, a website model that provides a user interface and navigation system.

FIG. 2 illustrates an exemplary image of a website that can be composed of multiple pages that point up a simple navigation system with a diagram of steps that can be executed to provide an interface connected to the processing system executing process 200. Content management and hosting can be handled by a technical team in coordination with the development of the website.

Process 200 begins in step 201 in which the display is generated by the processing unit in the process executing 200. In step 201a, the processing system is accessing process via an Internet connection which is transmitted to the display device user interface 201 of the processing system. In step 201b, the processing system is prompting the user, returning member to login.

In step 203, process 200 executes a returning user information look-up and checks to determine whether user is authorized to login as a returning member in step 202. Process 200 determines whether there is a member file for the user and which is preferably completed by searching the member file database, which is the database collectively formed by database modules 113, 114, 115, 116, 117, 118, 119, 120 as noted previously, for a file having a match for the user name. Essentially, in step 203, process 200 compares the member login information with the data stored in the user file in the member file database validated by an access code which is issued exclusively to each member at the point of registration such as in module 114 of the member file database. If the user is not authorized, process 200 generates a process denied message that is displayed to user in step 202. If authorized, process 200 continues to step 211.

In step 204, process 200 requests an individual to register as a new member. Upon clicking the registration button, process 200 continues to step 205. In step 205, registering user completes an individual profile application and process continues to step 209. In step 206, process 200 requests an individual operating as an agent or representative of a business entity to register as a new business member. Upon clicking the new business registration button, process 200 continues to step 207. In step 207, user completes a business information profile. In step 208, process 200 determines whether user is authorized to proceed to step 209. If user is an individual registering as an individual not as a business entity or commercial contractor, process 200 continues to step 209. Otherwise, process continues to step 210.

In step 209, the personal data inquiry, user completes a personal questionnaire and process 200 continues to 210 for payment. In step 210, process 200 can request method of payment for each user and transmit confirmation of payment to the display. Process 200 executes payment through the gateway and continues to step 211.

In step 211 process 200 can execute one or more requests until a quit or exit is received. If a quit or exit is received, process 200 ends. Otherwise process 200 returns to 211 to receive another option.

Figure 3:
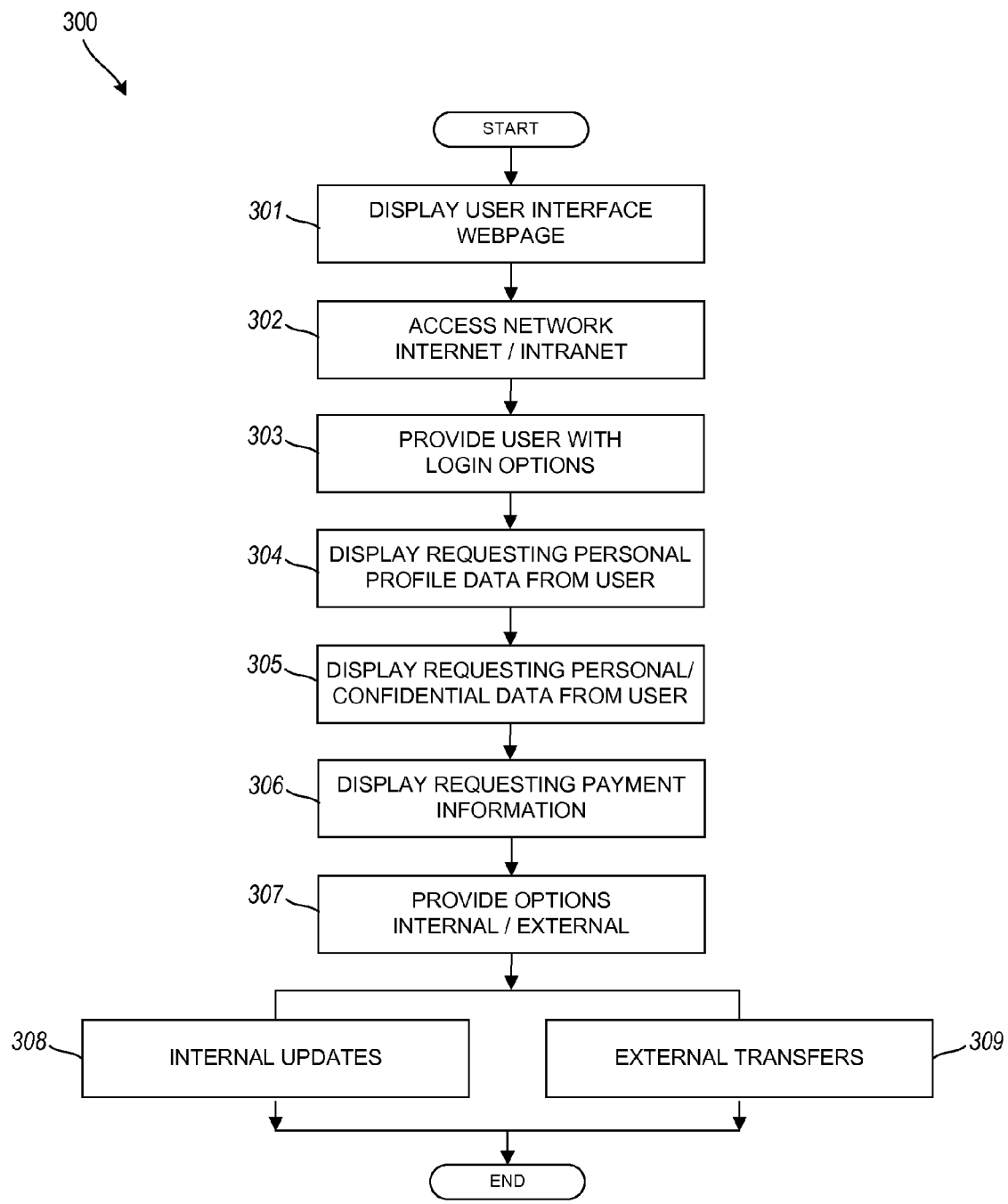
FIG. 3 is a flowchart diagram illustrating method steps for a secure membership data sharing system, illustrating, in particular, steps to provide a user-centered design for a user interface and navigation system for a registering member, according to an embodiment of the technology described herein.

Referring now to FIG. 3, a flowchart diagram 300 is shown, illustrating method steps for a secure membership data sharing system, and illustrating, in particular, steps to provide a user-centered design for a user interface and navigation system for a registering member.

FIG. 3 illustrates a flow diagram of a user-centered design of a process 300 executed to provide the interface referenced in FIG. 2. Process 300 begins in step 301 in which the display is generated by the processing unit executing process 300.

In step 302, the processing system is accessing process via an internet connection which is transmitted to the display device 301 of the processing system.

In step 303, process 300 receives a request for an option to be performed. Process 300 then determines the option requested by the user. For example, the option is received as a request to login for a returning user or as a request to register either as a new member or a new business member. The request may be entry of a user name and password of a returning user or a "click" on a glyph "button" by either a registering individual or a new business user. If a new registration request is received, process 300 continues to step 304. If new registration is not completed, process then returns to step 303 to receive another option by input of user. If user is a returning user, process 300 continues to step 307.

In step 304, process 300 transmits a display requesting profile data information from user. The request is executed by a "click" on a "button" of the screen directly related to the request. The information can be received by direct input. If user proceeds to step 305, process 300 transmits and stores the personal profile data to the client server and process 300 continues to step 305. In step 304, process 300 transmits a message to user the option to proceed to step 305 or to exit from step 304. If an exit request is received, step 305 ends and process returns to step 303. Otherwise, process 300 continues to step 305.

In step 305, process 300 transmits a display requesting personal and confidential data from user. If user proceeds to step 306, process 300 transmits confidential user data onto an embedded form such as in module 115 in the member file database. Process 300 has determined user is newly registered and if a new user, process 300 continues to step 306 to process payment.

In step 306, process 300 transmits a display requesting the credit/debit information of user. The information is received by direct input. Authorization of payment is processed and displayed to user. If user is authorized, process 306 then ends and user continue to Options, in step 307. If request is not authorized, step 306 requests re-entry of credit/debit information or process 306 ends.

In step 307, process 300 can receive multiple options to be performed. In step 307 a request to view any option can be received and a display is then transmitted to user. Process 300 then determines the specific option requested by the user. In step 307 requests for options are received and executed. Internal updates are processed in step 308. External transfers are proceeded in step 309. Process 300 then ends.

Figure 4:
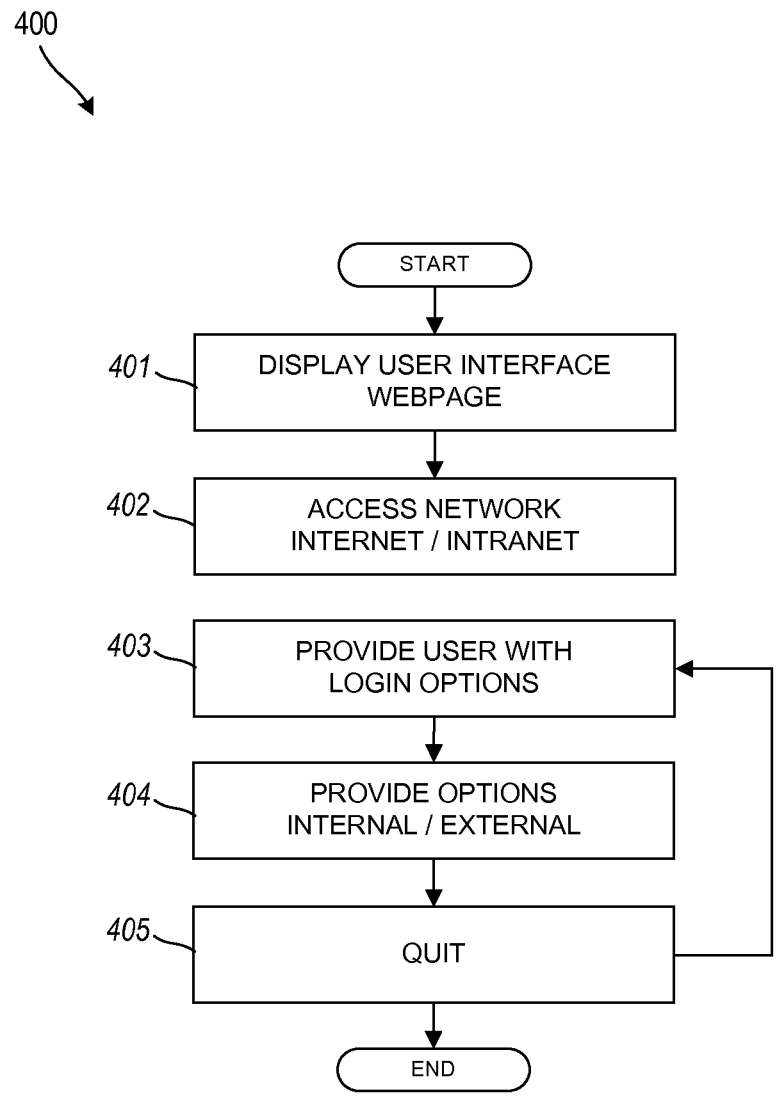
FIG. 4 is a flowchart diagram illustrating method steps for a secure membership data sharing system, illustrating, in particular, steps to provide a user-centered design for a user interface and navigation system specifically for when the user is a returning user, according to an embodiment of the technology described herein.

Referring now to FIG. 4, a flowchart diagram 400 is shown, illustrating method steps for a secure membership data sharing system, and illustrating, in particular, steps to provide a user-centered design for a user interface and navigation system specifically for when the user is a returning user.

FIG. 4 illustrates a flow diagram of a user-centered design of a process 400 executed to provide the interface for a returning user/member referenced in FIG. 2. Process 400 begins in step 401 in which the display is generated by the processing unit executing process 400.

In step 401, process 400 is accessing process via an internet connection, as in step 402, and which is transmitted to the display device 401 of the processing system. In step 403, process 400 requests returning user to login. The user information is then checked to determine whether the user is authorized to access the website process 400. Process 400 executes a returning user information look-up in the member file database in step 403. If authorized, process 400 continues to step 404 to receive option requests. If no option requests are executed or an exit request is received, such as a quit option in step 405, step 404 ends and process returns to 403.

Figure 5:
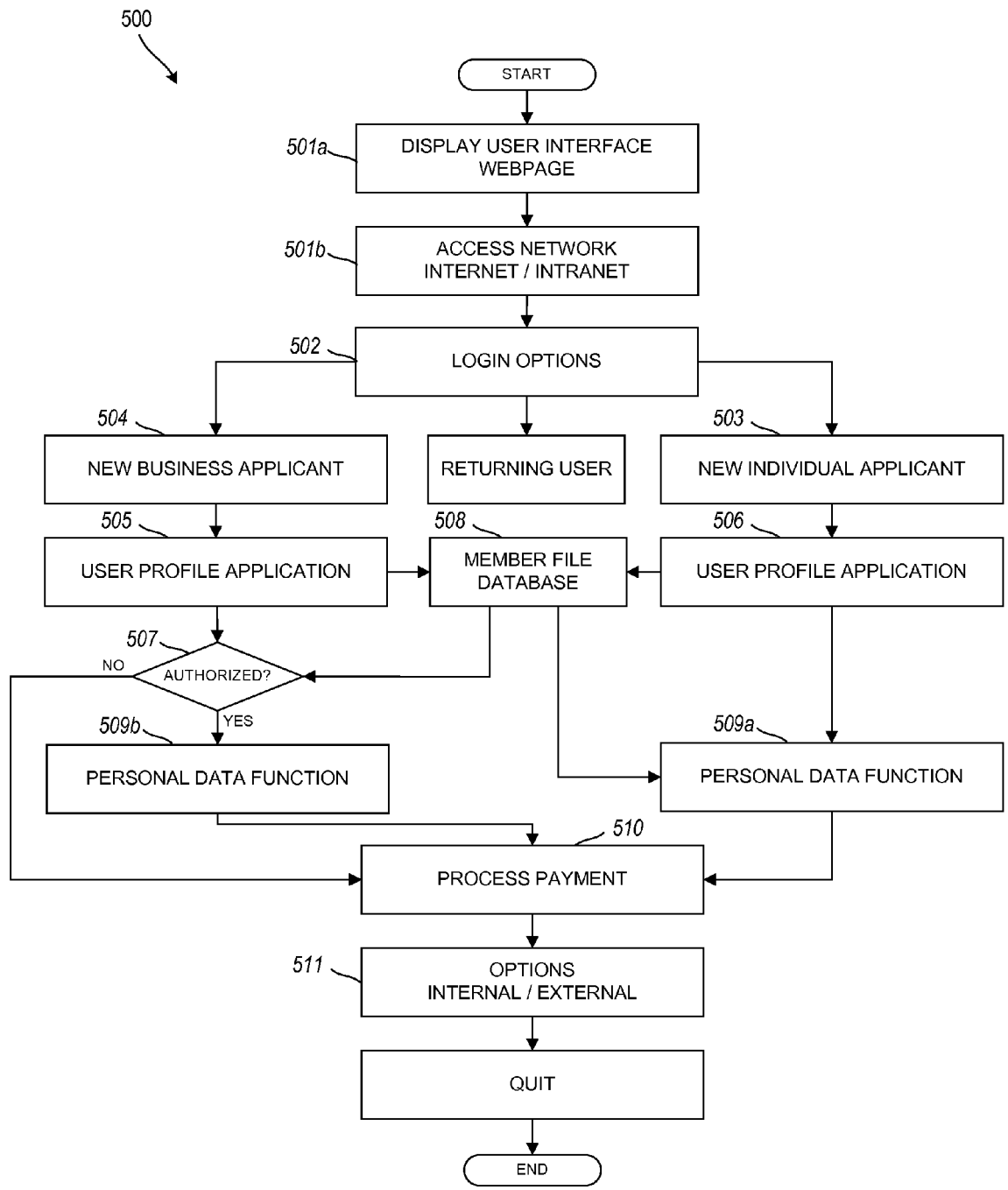
FIG. 5 is a flowchart diagram illustrating method steps for a secure membership data sharing system, illustrating, in particular, the process steps for providing options of login to new users, according to an embodiment of the technology described herein.

Referring now to FIG. 5, a flowchart diagram 500 is shown, illustrating method steps for a secure membership data sharing system, and illustrating, in particular, the process steps for providing options of login to new users.

Process 500 illustrated in FIG. 5 is a process executed in accordance with the technology described herein for providing options of login to new users as referenced in FIG. 2. Process 500 begins in step 501*a* in which the display is generated by the processing unit executing process 500. In step 501*b*, the processing system is accessing process via an internet connection which is transmitted to the display device 501*a* of the processing system.

In step 502, process 500 is presenting user with login options, accessing process via an internet connection which is transmitted to the display device 501 of the processing system. In steps 503 and 504, process 500 requests an individual to register as a new member in one of two capacities, either as a private individual in step 503 or as an individual operating as an agent or representative of a business entity in step 504.

In step 503, process 500 requests an individual to register as an individual new member. Upon clicking the registration button, process 500 continues to step 506. In step 506, process 500 transmits a display requesting profile information personal to the user. The request is executed by a "click" on a "button" of the screen directly related to the request. The data can be received by direct input and process 500 transmits and stores the personal profile data to the member file database in step 508. Step 506 transmits a message to user the option to proceed to step 509*a* or to exit from step 506. If an exit request is received, step 506 ends and process returns to step 503. Otherwise, process 500 continues to step 509*a* upon execution of the request.

In step 504, process 500 requests an individual operating as an agent or representative to register as a new business member. Upon clicking the registration button, process 500 continues to step 505. In step 505, process 500 transmits a display requesting profile information personal to user. The request is executed by a "click" on a "button" of the screen directly related to the request. The data can be received by direct input. If the user is registering as an individual on their own behalf albeit a business agent or representative 500 transmits and stores the personal profile data to the member file database in step 508. Step 505 transmits a message to user the option to proceed to step 509*b* or to exit from step 505. If an exit request is received, step 505 ends and process returns to step 502. Otherwise, process 500 continues to step 507 to authorize further processing in step 509*b*.

If the user is registering as a business entity, not an individual, 500 continues to step 510 to request method of payment for user. Process 500 transmits confirmation of payment to the display. Process 500 executes payment through the gateway and continues to step 511.

In step 509, process 500 transmits a display requesting personal and confidential data from the user. If user proceeds to step 509, process 500 extracts data from the user profile application stored in the member file database 508 to auto-populate redundant fields requested on the confidential data form in step 509. In step 509, process 500 then transmits confidential user data onto an embedded form in the data report file in the member file database in step 508. Step 509 transmits a message to user the option to proceed to step 510 or to exit from step 509. If an exit request is received, step 509 ends and process returns to step 502. Otherwise, process 500 continues to step 510 to process payment upon execution of the request. The transition from step 509 to step 510, by a registering first-time user, triggers process 500 to execute requests to integrate multiple processes. Upon process of payment in step 510, process 500 transmits predetermined responses voluntary selected by user in step 509 from the confidential data form generated in step 509 and stored in the member file database in step 508 to a numbered file data report such as in module 115. Process 500 stores and maintains the personal data file contents of the user such as in module 113 in the member file database segregated from every member in step 508. Process 500 executes user request to initiate and verify the information contained within the data report upon user payment in step 510. Confirming payment, process 500 may execute user request to accurately authenticate the user data report through a compatible data checker component that initiates and completes check of user data and returns an encrypted report to process for storage in the member file database step 508 maintaining the user personal data file in step 509. Process 500 may prompt a message that requests user to retrieve a pending data report to be reviewed and validated by user after a short duration of time. Process 500 can provide a status message to user of the readiness of the data report in step 511. Duration of time to check and validate the data report pending completion can be from 24 to 72 hours. Process 500 continues to 511.

In step 511, process can execute internal or external requests. Process 500 can execute a user option to quit or exit step 511.

Figure 6:
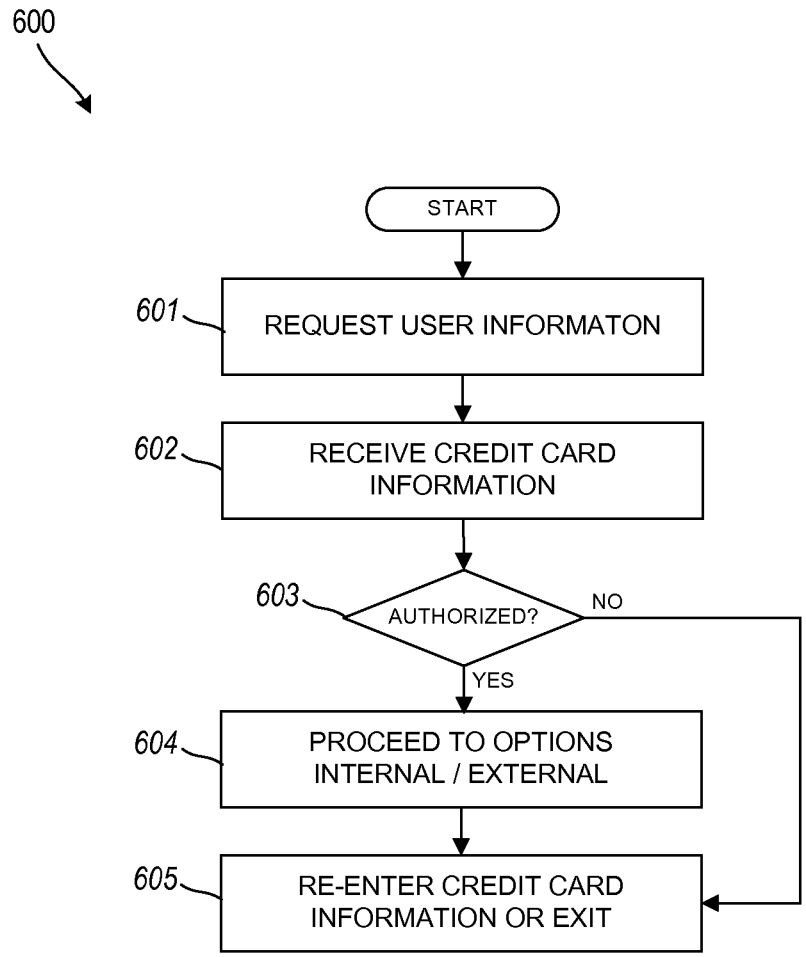
FIG. 6 is a flowchart diagram illustrating method steps for a secure membership data sharing system, illustrating, in particular, the process steps for providing payment options and receiving payments from members, according to an embodiment of the technology described herein.

Referring now to FIG. 6, a flowchart diagram 600 is shown, illustrating method steps for a secure membership data sharing system, and illustrating, in particular, the process steps for providing payment options and receiving payments from members.

FIG. 6 illustrates a flow diagram of a process 600 for providing payment options and receiving payments from members in accordance with the technology described herein. One skilled in the art will recognize, upon reading this disclosure, that payment gateways may be a custom designed database or a standard authorized credit/debit for services that may be incorporated into the system of the technology described herein.

Process 600 for providing payment options and receiving payments from members begins in step 601 by transmitting a display requesting user information in which the display is generated by the processing unit executing process 601. In step 602, the user information is received by process 600. The information is received by a direct input. In step 602, process 600 receives user credit/debit information. The information may be from varied creditor institutions providing user with debt servicing access. Authorization of payment is processed in step 603 and displayed to user in step 604. If user is authorized, process 600 then ends and user continues to, Options, Internal/External such as in step 703 of process 700. If request is not authorized, step 605 requests re-entry of credit/debit information or process 600 ends.

Figure 7:
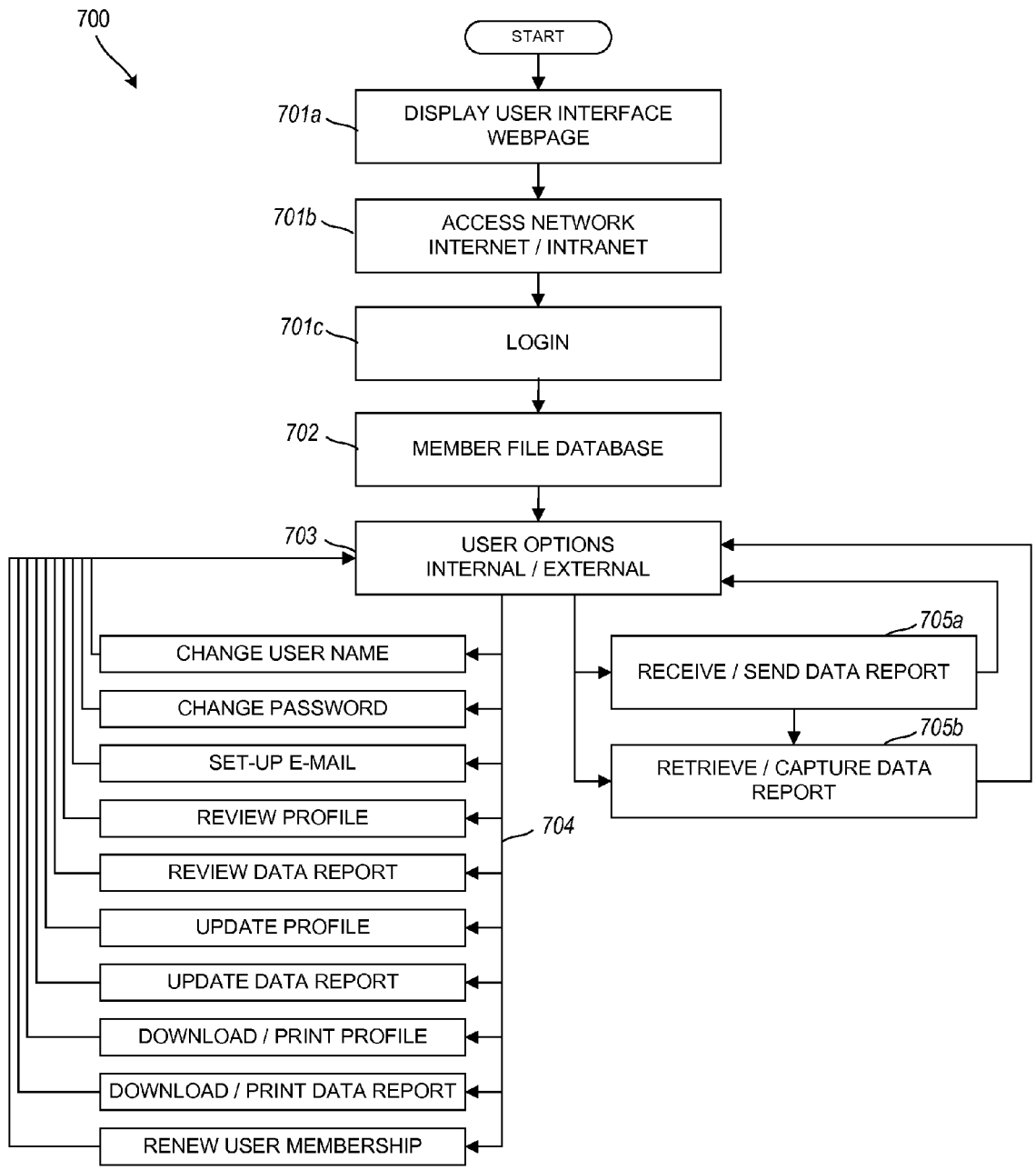
FIG. 7 is a flowchart diagram illustrating method steps for a secure membership data sharing system, illustrating, in particular, the process steps for providing and receiving from a member database file multiple options selectively to be performed, according to an embodiment of the technology described herein.

Referring now to FIG. 7, a flowchart diagram 700 illustrating method steps for a secure membership data sharing system, illustrating, in particular, the process steps for providing and receiving from a member database file multiple options selectively to be performed is shown.

Process 700 illustrated in FIG. 7 is a process executed in accordance with the technology described herein for providing and receiving multiple options from a member file database to be performed. Process 700 can determine the specific option requested by the user. Options in process 700 may be received as requests to execute internal updates or execute external information transfers. The request is executed by a "click" on a "button" of the screen or may be a drop down menu directly related to the request. The information can be received by direct input.

Process 700 begins in step 701*a* in which the display is generated by the processing unit executing process 700. In step 701*b*, the processing system is accessing process via an internet connection which is transmitted to the display device 701*a* of the processing system. In step 701*c* the process is requesting a returning member to login such as in step 202, process 200. Immediately after validation of login such as in step 203, and as in step 702 wherein the input is credentialed against member file database, process 700 then connects member to step 703, such as in step 511.

In step 703, process 700 generates a display of a list of options to execute to user. A request for an option is then received. Process 700 may provide messages to a member in step 703 that are automatically generated by the system. For example, process may prompt a user to retrieve a pending data report to be reviewed and validated by user or a message to retrieve information being made available to user from another member. The messages may include information and instructions to assist the member with option selections. Process 700 executes each request as user complies with the choices indicated in the message option to proceed with the action requested in the message.

Options in step 703 may by process 700 be received as requests to execute internal updates or execute external information transfers. In step 703, process 700 internal updates may be to change user-name, change password, set-up user email account, review user profile, review data report, update user profile, update user data report, download/print user profile, download/print user data report, and renew user membership. The screen can display each internal update option. If an internal update request was received, process 700 generates a process message displayed to user in step 703 relevant to the request and process 703 continues to step 704. If a request is performed in step 704, process 700 returns to step 703 to receive another option. If an option for external information transfers, for example, a release/send data report, retrieve/capture data report request was received process 700 generates a process message displayed to user in step 703. The screen can display each external information transfer option. If an external information transfer request was received, process 700 generates a process message displayed to user in step 703 relevant to the request and process 700 continues to step 705. If a request is performed in 705, such as receive/send data report in 705*a* and receive/capture data report in 705*b*, process 700 returns to step 703 to receive another option. If additional requests are performed, process 703 continues to step 704 or step 705. If an exit request is received, step 703 ends and process returns to step 701.

The Secure Member Data Sharing Process Network includes Internet or Intranet that facilitates the connection between various processing systems to enable exchange of data between the processing systems. The processing systems can be personal computers, routers, servers, or other devices that process digital data for these purposes. In accordance with the technology described herein, an interface is provided that may access the database needed by each user to exchange proprietary information with any user member within the system. The interface may be provided by software executed by a server within the network using a browser or other access software. The distinctions between personal and private information of an individual and the data report of the user referenced in this technology are several. The primary difference is the user data report is derived from information that contains factual background specifics of the user within a social context. The core information of the data report is founded upon a questionnaire to which each user responds with personal data. The next difference is the data voluntarily provided by the user offered is checked, validated and confirmed for accuracy by a compatible data checker and approved by user. The user data report is provided voluntarily to a user through a secure system interface. Each member has the option of sharing their data report with another member in the processing system.

Figure 8:
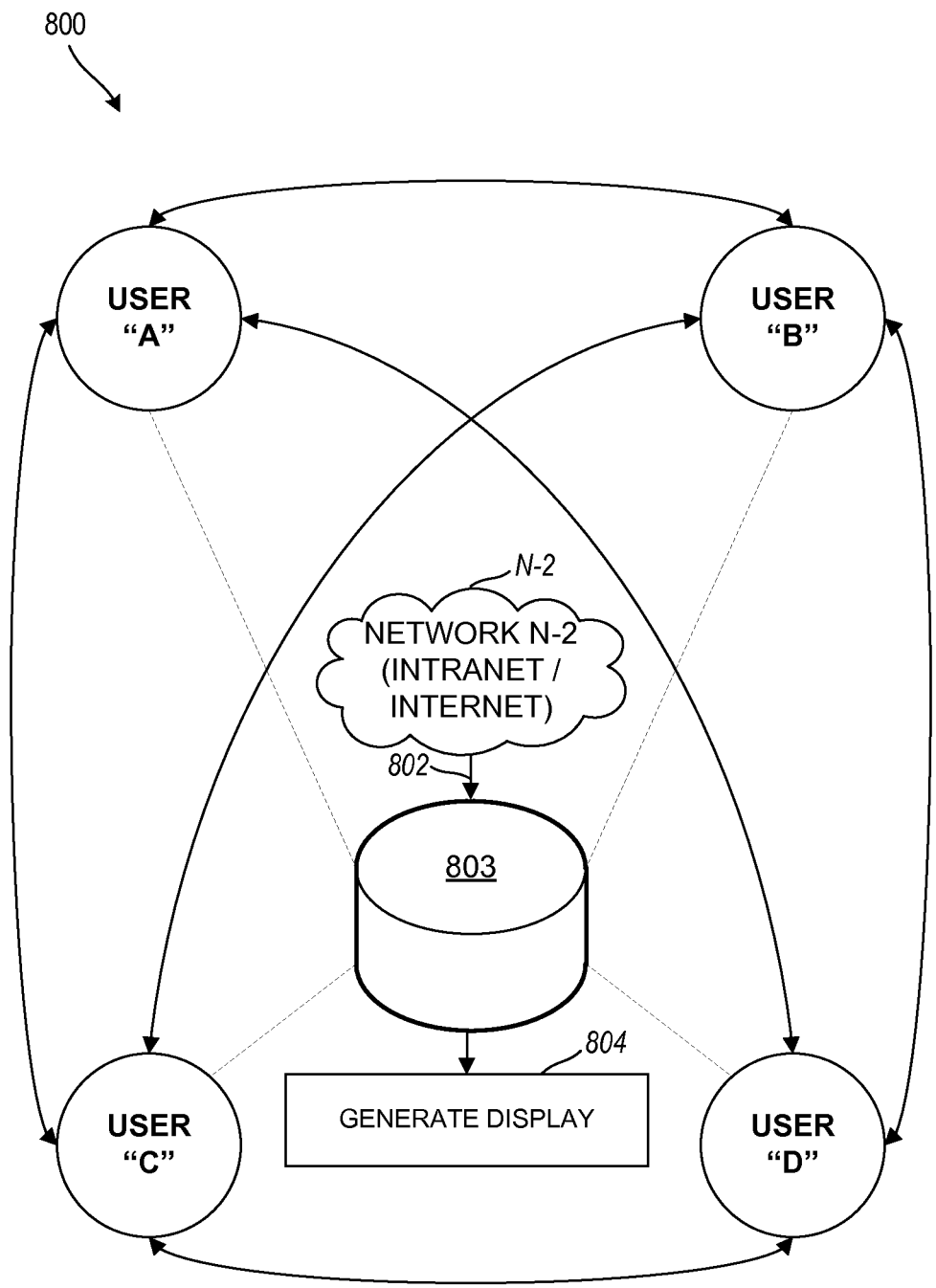
FIG. 8 is a schematic diagram illustrating a network of users and also the interaction users with the member file database and other users, illustrating, in particular, various process steps for the exchange of individual data reports between users/members within a system protected environment, according to an embodiment of the technology described herein.

Referring now to FIG. 8, a schematic diagram 800 is shown, illustrating a network of users and also the interaction users with the member file database and other users, and illustrating, in particular, various process steps for the exchange of individual data reports between users/members within a system protected environment.

FIG. 8 illustrates a network of users of a process 800 that displays a process of exchange of individual data reports between user/members within a system-protected environment.

In User Network 800, user laptops, for example, are connected to the Internet/Intranet, Network N-2, such as in paths 102, 104. Personal computers are connected to the Internet/Intranet such as in paths 107, 108. One skilled in the art will recognize that paths 102, 103, 107 and 108 may be wireless, telephone, Ethernet lines or any other technique of connecting processing systems. An information database server 803 such as in paths 110 or 111 can be connected to the Internet/Intranet 800. A database server is a processing system that maintains multiple databases that are accessed by this technology.

In step 802, the processing system is accessing process via an internet connection which is transmitted to the display device of the processing system of each user. For example, User "A," User "B," User "C" and User "D" can be connected to the member file database simultaneously or at different times. The member file database is a database that can store client information of a proprietary nature in two separate files: personal profile information and the data report of each member. Each file may be updated by user.

In step 803, process 800 receives a request for an option to be performed such as in step 705. The option may be received as a request from a workstation or as an input into the processing system. If the processing system is directly performing the process, the request may be a "click" on a "button" of the screen by a pointing mechanism such as a mouse or generated by a workstation in response to a "click" on a "button" on a display of the workstation if the workstation is connected to the processing system executing process 800. Process 800 then determines which option was requested. In step 804, process determines whether a release/send data report or a retrieve/capture data report request was received, and generates the appropriate display. Process 800 can execute a request to perform either option. In step 805 the request can be from User "A" to release/send the data report to User "B" and/or User "C" and/or User "D." Process performs a user look-up in the memory file database for a file matching each user/member. The request of User "A" is executed and multiple messages are then transmitted to the screen of User "A" or the Initiating Member who initiated the option request. Process 800 then receives a request from the recipient user or the Receiving Member in response to the message.

Figure 9:
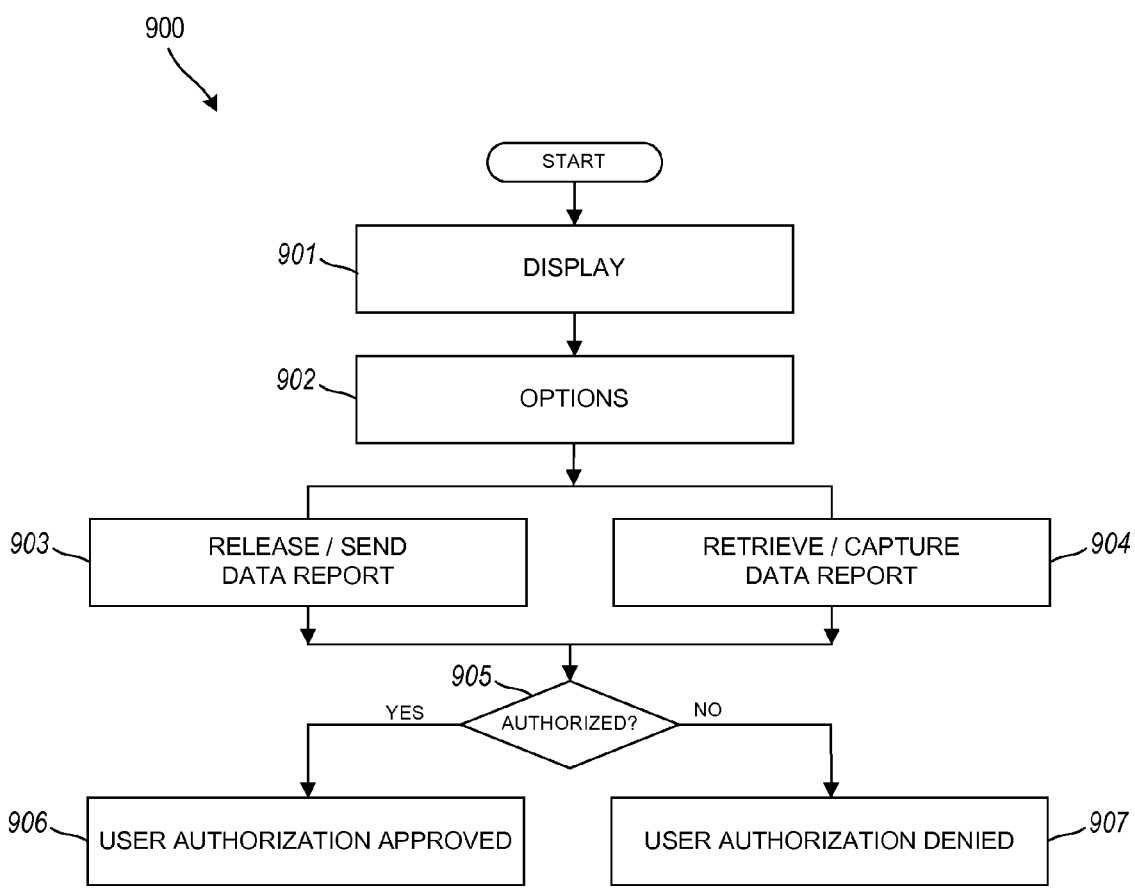
FIG. 9 is a flowchart diagram illustrating method steps for a secure membership data sharing system, illustrating, in particular, the process steps for accessing the personal information of users/members from the member file database to perform the exchanging and sharing of private data between authorized users, according to an embodiment of the technology described herein.

Referring now to FIG. 9, a flowchart diagram 900 is shown, illustrating method steps for a secure membership data sharing system, illustrating, in particular, the process steps for accessing the personal information of users/members from the member file database to perform the exchanging and sharing of private data between authorized users.

Process 900 illustrated in FIG. 9 is a process executed in accordance with the technology described herein for accessing personal information of users from the member file database to perform the exchanging and sharing of private data between authorized users. Process 900 begins in step 901 with a display of the two external options of process to execute in step 902.

In step 902, process 900 receives a request for an option to be performed. The option can be received as a request by user input. Process 900 then determines which option was requested by user. Whether a release/send data report in step 903 or a retrieve/capture data report in step 904 is requested in step 902, process 900 receives and executes the user authorization request in step 905 for each user of either option.

In step 902, process 900 receives a request to release/send a data report. Process 900 performs a user authorization request on the user or "Initiating Member." In step 905, process 900 opens the user record and determines whether the Initiating Member is a current member registered in the member file database, and thus, whether the data report is authorized to be released by the Initiating Member. In step 905, process 900 performs a member record lookup of the Initiating Member in the member file database by matching the user member file with the user identity code such as in module 114, issued to the Initiating Member at the point of registration in processing. In step 905, the file records of the Initiating Member can match the search criteria. If the Initiating Member is authorized, process 900 performs a process approved message in step 906 that is displayed to user in step 901. If the Initiating Member is not authorized, process 900 performs a process denied message in step 907 that is displayed to user in step 901. Process 900 returns to step 903.

In step 903, process 900 receives a request to execute an option in step 903 to release/send a data report to another member. In step 903, process 900 receives the request by direct input of the Initiating Member. Process 900 generates a message to the Initiating Member displayed in step 901 to input the proper name as well as the user name of the Receiving Member into the proper fields in the message. In step 906, process 900 executes a request to perform a user authorization check on the Receiving Member. Process 900 continues to step 905.

In step 905, process 900 determines whether the user or "Receiving Member" is authorized to retrieve/capture the data report of the Initiating Member. In step 905, process 900 accesses the user file record and performs a member record lookup of the Receiving Member in the member file database by matching the user member file with the user identity code such as in module 114, issued to the Receiving Member at the point of registration in processing.

In step 905, process 900 determines if the file records of the Receiving Member match the search criteria and approve the user to receive the data report. In step 906, process 900 performs a process approved message that is displayed to both the Initiating Member and the Receiving Member if the user is authorized. If the Receiving Member is not authorized, process 900 performs a process denied message in step 907 that is displayed to the Initiating Member in step 901. Process 900 continues to step 904.

In step 904, process 900 receives a request to execute an option in step 904 to retrieve/capture a data report from an Initiating Member. In step 904, process 900 receives the request by direct input of the user or "Requesting Member."

Process 900 generates a message to the user displayed in step 901 to input the user name of Receiving Member as well as the member access code or "MAC" accessed by the Receiving Member through a hyperlink in the email of the Receiving Member into the proper fields in the message. In step 906, process 900 performs a user authorization request on the Receiving Member. In step 905, process 900 receives a request for an option to transmit the message for processing. If the Receiving Member is authorized, process 900 can auto-generate a process approved message that is displayed to the Receiving Member in step 901. In step 904, process executes a request to retrieve/capture the data report of the Initiating Member and transmit the data report of the Initiating Member to the display of the Receiving Member in step 901. Process 900 then ends.

Figure 10:
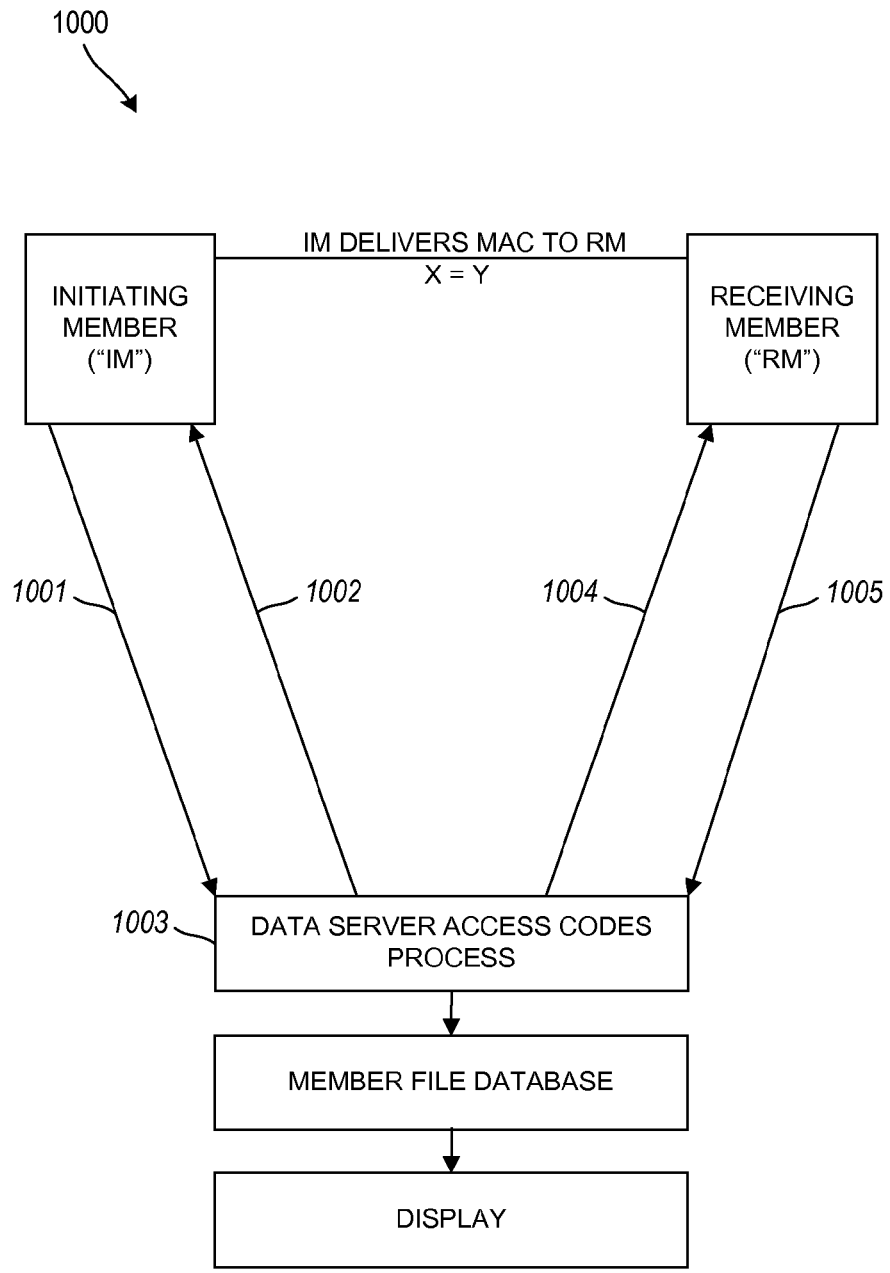
FIG. 10 is a flowchart diagram illustrating method steps for a secure membership data sharing system, illustrating, in particular, the process steps for releasing and retrieving user data reports between members from the member file database, according to an embodiment of the technology described herein.

Referring now to FIG. 10, a flowchart diagram 1000 illustrating method steps for a secure membership data sharing system, illustrating, in particular, the process steps for releasing and retrieving user data reports between members from the member file database is shown.

Process 1000 illustrated in FIG. 10 is a process executed in accordance with the technology described herein for releasing and retrieving user data reports between members from the member file database.

Process 1000 begins in step 1001 by executing a request for an option to perform a release/send of a data report from a user or "Initiating Member." The option is received as an input into the processing system. After the request for the execution of the option is received, process 1000 determines whether there is a file record for the Initiating Member as a preliminary security check executed by process 1000. Process 1000 then generates a message to the user or Initiating Member to provide a user name and social security number in step 1002. In step 1002, process 1000 completes the request by matching the user name and social security number of the Initiating Member with the identity access code, such as in module 114, of the user in the member file database internally in step 1001.

If the user is not authorized to request the option to release/send the user data report, process transmits an access denied message to the user with a request for a corrective input of information in step 1002. If the Initiating Member is user authenticated, process 1000 auto-generates a message to the Initiating Member to provide the proper name and user name of the recipient or "Receiving Member" of the data report of the Initiating Member in step 1002.

In step 1001, the Initiating Member provides the requested data, for example, the proper name and login name of the Receiving Member. In step 1003, process 1000 then accesses the files of the Receiving Member to determine whether there is a file record for the Receiving Member in the member file database in step 1003. In step 1003, process 1000 then performs a member file database search for the user records that match the requested criteria. If the Receiving Member is user authenticated, options are then auto-generated and displayed to the Initiating member in step 1002. Process 1000 continues to step 1005.

In step 1005, process receives a request for an option to be performed. Received as a user input, process 1000 then determines which option was requested. For example, the user display may include options for information exchange, release/send a user data report, retrieve/capture a user data report, or other options. Process 1000 transmits the options displayed to the user or "Receiving Member" screen. If a release/send user data report is requested in step 1001, process 1000 executes this option by transmitting a message to the Receiving Member in step 1004. If the Receiving Member is user-authenticated, process 1000 transmits a message request to the Receiving Member with options to retrieve the data report of the Initiating Member in step 1004. This display can be an option "to accept" or "not to accept" the data report from the Initiating Member. Process 1000 then determines which option was requested in step 1005. Received as a user input, if a "not to accept" the data report is received, the data report is cancelled by process in step 1003. If a "to accept" the data report is received in step 1005, process generates instructions to retrieve the data report in step 1004. Process 1000 confirms the response to any message executed by option request of the Receiving Member to the Initiating Member.

In step 1004, process 1000 can by direction execute a Receiving Member option to access a hyperlink in an email generated by process 1000 that provides a member access code or "MAC." Process 1000 determines whether access is executed by the Receiving Member and, if received, process 1000 generates and attaches a MAC to the data report of the Initiating Member in step 1002 and simultaneously issues a MAC number to the Receiving Member in step 1004. Process 1000 then receives an execute data report request from the Receiving Member in step 1005 and instructs the Receiving Member in step 1004 to insert the MAC and the user name of the Receiving Member into the proper field of the message form.

In step 1005, process 1000 receives a request to execute delivery of the data report to the Receiving Member. Process 1000 then transmits the data report by message to the display of the Receiving Member in step 1004. Process 1000 confirms delivery of the data report by message to the Receiving Member in step 1004 and Initiating Member in step 1002. If a quit or exit is received, process 1000 ends. Otherwise, process 1000 returns to either 1001 or 1005 to receive another option.

Figure 11:
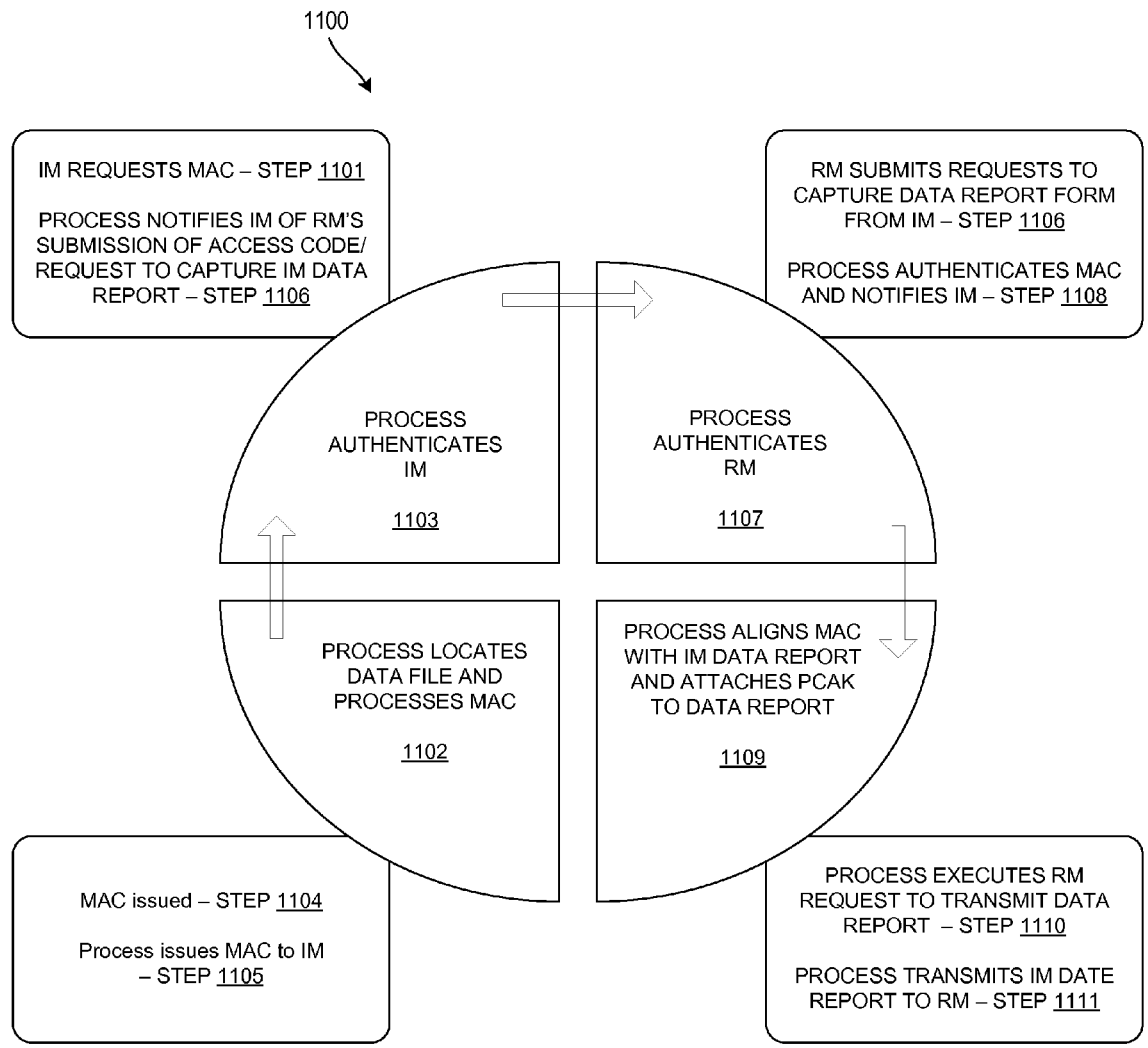
FIG. 11 is a flowchart diagram illustrating method steps for a secure membership data sharing system, illustrating, in particular, the process steps for generating a progressive code access key exclusive to data reports exchanged between users, according to an embodiment of the technology described herein.

Referring now to FIG. 11, a flowchart diagram 1100 is shown, illustrating method steps for a secure membership data sharing system, illustrating, in particular, the process steps for generating a progressive code access key exclusive to data reports exchanged between users.

Process 1100 illustrated in FIG. 11 is a process executed in accordance with the technology described herein for generating a progressive code access key exclusive to data reports exchanged between users.

Process 1100 begins in step 1101 by executing a request for an option to perform a release/send of a data report from a user or "Initiating Member," such as in step 1001 process 1000. Process 1100 then generates a member access code or "MAC" upon the request of the Initiating Member in step 1101 synchronized with the access of the member data file of the Initiating Member in step 1102 and authentication of the Initiating Member in step 1103, such as in step 1003 in process 1000. Process 1100 then authenticates the Receiving Member such as in step 905 of process 900 pending validation of member status of the Receiving Member by process in step 1107. In step 1103, process 1100 authenticates the Initiating Member and proceeds to step 1104. In step 1104, process 1100 performs the release of the MAC that is specifically assigned to each user data report contemporaneous with the transmittal of the MAC to the Initiating Member in step 1105.

In step 1106, process 1100 executes the option of the Receiving Member to retrieve/capture the data report of the Initiating Member which can be concomitant upon execution of the request to release/send the data report by the Initiating Member in step 1101 by process message to the Receiving Member in step 1105. In step 1106, process executes the request of the Receiving Member to retrieve/capture the data report of the Initiating Member. In step 1107, process 1100 confirms the authenticity of the Receiving Member concurrent with the execution of the option to request the data report of the Initiating Member with submittal of the MAC and user name by the Receiving Member validated by process upon receipt of the MAC in step 1110. In step 1108, process 1100 confirms the transmittal of the MAC to the Initiating Member.

In step 1109, process 1100 combines the data report with the MAC and assigns a progressive code access key for internal operational record-keeping purposes.

In step 1110, process 1100 transmits the MAC to the Receiving Member by email with instructions to enter the MAC and user name of the Receiving Member in the relative message fields. Process 1100 executes the request of Receiving Member to execute transmittal of the data report of Initiating Member. In step 1111, process 1100 transmits the data report of the Initiating Member. Process 1100 ends.

Figure 12:
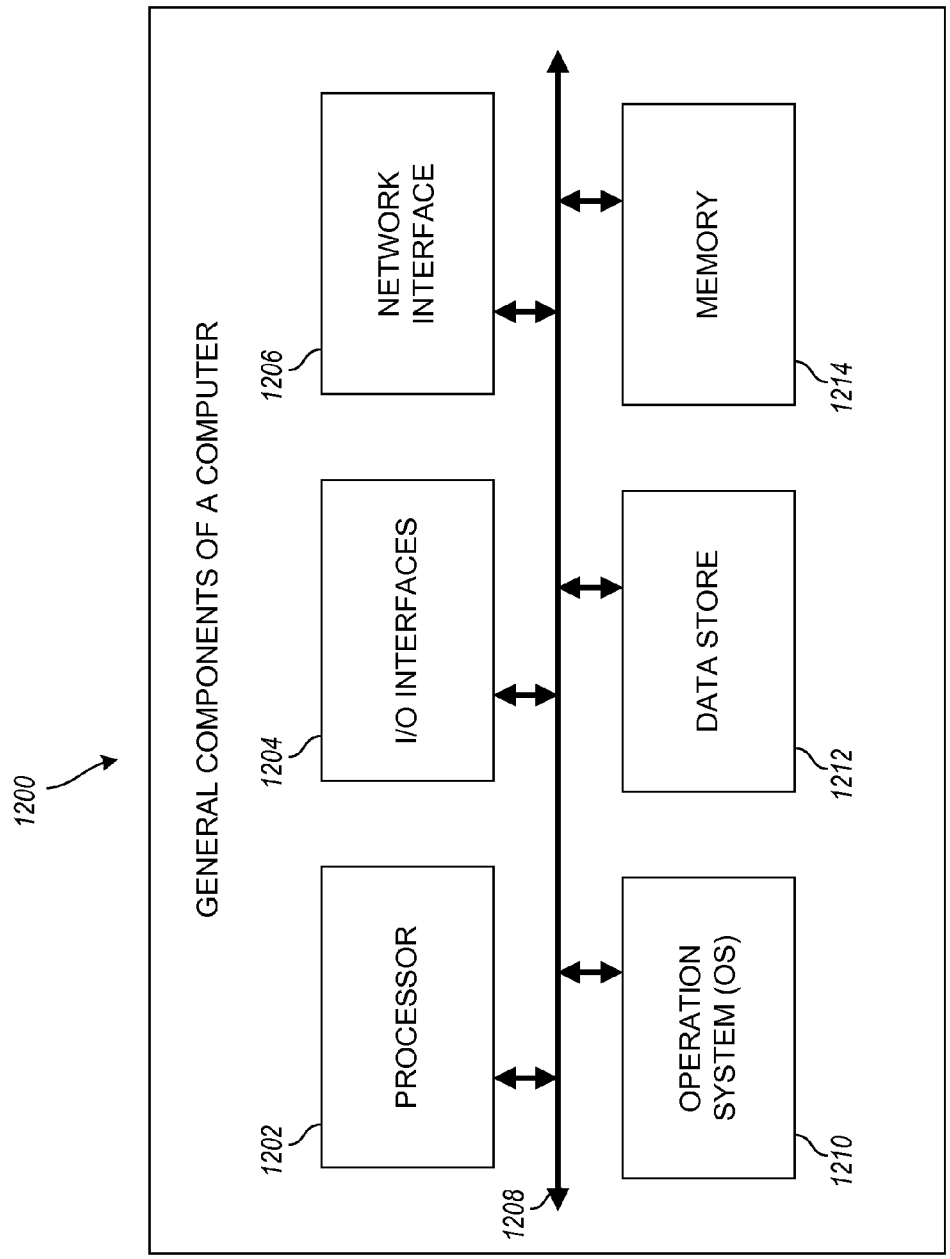
FIG. 12 is a block diagram illustrating the general components of a computer according to an exemplary embodiment of the technology, and upon which any one or more of the method steps described within are implemented in various embodiments.

Referring now to FIG. 12, a block diagram 1200 illustrating the general components of a computer is shown. Any one or more of the computers, laptops, servers, databases, and the like, disclosed above, may be implemented with such hardware and software components. The computer 1200 can be a digital/virtual computer that, in terms of hardware architecture, generally includes a processor 1202, input/output (I/O) interfaces 1204, network interfaces 1206, an operating system (O/S) 410, a data store 1212, and a memory 1214. The components (1202, 1204, 1206, 1210, 1212, and 1214) are communicatively coupled via a local interface 1208. The local interface 1208 can be, for example but not limited to, one or more buses or other wired or wireless connections, as is known in the art. The local interface 1208 can have additional elements, which are omitted for simplicity, such as controllers, buffers (caches), drivers, among many others, to enable communications. Further, the local interface 1208 can include address, control, and/or data connections to enable appropriate communications among the aforementioned components. The general operation of a computer comprising these elements is well known in the art. In at least one embodiment, one or more aspects of the method are hosted in the network cloud, in one or more of a cloud computing model, nanotechnology model, or biotechnology model.

The processor 1202 is a hardware device for executing software instructions. The processor 1202 can be any custom made or commercially available processor, a central processing unit (CPU), an auxiliary processor among several processors associated with the computer 1200, a semiconductor-based microprocessor (in the form of a microchip or chip set), or generally any device for executing software instructions. When the computer 1200 is in operation, the processor 1202 is configured to execute software stored within the memory 1214, to communicate data to and from the memory 1214, and to generally control operations of the computer 1200 pursuant to the software instructions.

The I/O interfaces 1204 can be used to receive user input from and/or for providing system output to one or more devices or components. User input can be provided via, for example, a keyboard and/or a mouse. System output can be provided via a display device and a printer. I/O interfaces 1204 can include, for example but not limited to, a serial port, a parallel port, a small computer system interface (SCSI), an infrared (IR) interface, a radio frequency (RF) interface, and/or a universal serial bus (USB) interface.

The network interfaces 1206 can be used to enable the computer 1200 to communicate on a network. For example, the computer 1200 can utilize the network interfaces 1208 to communicate via the internet to other computers or servers for software updates, technical support, etc. The network interfaces 1208 can include, for example, an Ethernet card (e.g., 10BaseT, Fast Ethernet, Gigabit Ethernet) or a wireless local area network (WLAN) card (e.g., 802.11a/b/g). The network interfaces 1208 can include address, control, and/or data connections to enable appropriate communications on the network.

A data store 1212 can be used to store data, such as information regarding positions entered in a requisition. The data store 1212 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1212 can incorporate electronic, magnetic, optical, and/or other types of storage media. In one example, the data store 1212 can be located internal to the computer 1200 such as, for example, an internal hard drive connected to the local interface 1208 in the computer 1200. Additionally in another embodiment, the data store can be located external to the computer 1200 such as, for example, an external hard drive connected to the I/O interfaces 1204 (e.g., SCSI or USB connection). Finally in a third embodiment, the data store may be connected to the computer 1200 through a network, such as, for example, a network attached file server.

The memory 1214 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1214 may incorporate electronic, magnetic, optical, and/or other types of storage media. Note that the memory 1214 can have a distributed architecture, where various components are situated remotely from one another, but can be accessed by the processor 1202.

The software in memory 1214 can include one or more software programs, each of which includes an ordered listing of executable instructions for implementing logical functions. The operating system 1210 essentially controls the execution of other computer programs, such as the interactive toolkit for sourcing valuation, and provides scheduling, input-output control, file and data management, memory management, and communication control and related services. The operating system 810 can be any of Windows Server, Windows Azure, Windows NT, Windows 2000, Windows XP, Windows Vista, Windows 7, Windows 8 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), SendGrid, Amazon, Android, or other like operating system with similar functionality.

In an exemplary embodiment of the technology described herein, one or more computers 1200 are configured to perform one or more elements of flowcharts 200, 300, 400, 500, 600, 700, 800, 900, 1000, and 1100 depicted in FIGS. 2, 3, 4, 5, 6, 7, 8, 9, 10, and 11 respectively.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology described herein and are intended to be covered by the following claims.

What is claimed is:

1. A method for implementing a system for managing the utilization of personal proprietary information in social media, the method comprising:

providing a user interface through which members access the system across a network and for managing the utilization of personal proprietary information in social media;

providing a secure database server consisting of a plurality of database modules for the storage of proprietary information within the databases modules containing personal and private information available for voluntary release by every user in a membership capacity with other members;

executing, by an initiating member, a request to release and send a data report containing personal and private information of the initiating member to the receiving member;

generating a member access code, upon confirmed membership registration, to identify a member, and by which the member optionally elects to whom the member may provide the generated member access code;

assigning the member access code to a specific user data report;

providing the member access code assigned to the specific user data report and transmitting the member access code to the initiating member, for subsequent delivery from the initiating member to the receiving member;

executing an option of the receiving member to retrieve and capture the specific user data report of the initiating member;

validating the identity of the receiving member, if the receiving member so elects to retrieve and capture the specific user data report of the initiating member;

executing, if the authenticity of the receiving member is confirmed, the option of the receiving member to retrieve and capture the specific user data report of the initiating member;

pairing the specific user data report with the member access code;

transmitting to the receiving member the member access code to the specific user data report with instructions to enter the member access code and a user name of the receiving member into the user interface;

processing the request from the receiving member to retrieve and capture the specific user data report of the initiating member; and transmitting to the receiving member the specific user data report from the initiating member.

2. The method of claim 1, further comprising:

locating a personal data file of the initiating member from a module within the secure database server; and authenticating a first member status of the initiating member.

3. The method of claim 1, further comprising:

locating a personal data file of the receiving member from a module within the secure database server; and validating the identity of a second member status by the receiving member.

4. The method of claim 1, further comprising:

displaying to the initiating member a plurality of options through the user interface with activation buttons to actuate the secure the transfer of personal proprietary information to the receiving member.

5. The method of claim 1, further comprising:
displaying to the receiving member a plurality of options through the user interface regarding the secure receipt of personal proprietary information from the initiating member.

6. The method of claim 1, further comprising:
validating member payment information for the initiating member;
determining if payment is by a new member or a renewing existing member; and
updating the membership database.

7. The method of claim 1, further comprising:
validating member payment information for the receiving member;
determining if payment is by a new member or a renewing existing member; and
updating the membership database.

8. The method of claim 1, further comprising:
generating a progressive code access key, the progressive code access key defined by a progressive code access key database module of the secure database server; and
assigning the generated progressive code access key to the specific user data report.

9. A computer readable storage medium encoded with programming instructions for implementing a system for managing the utilization of personal proprietary information in social media, the computer readable storage medium encoded with programming instructions configured to:
provide a user interface through which members access the system across a network and for managing the utilization of personal proprietary information in social media;
provide a secure database server consisting of a plurality of database modules for the storage of proprietary information within the databases modules containing personal and private information available for voluntary release by every user in a membership capacity with other members;
execute, by an initiating member, a request to release and send a data report containing personal and private information of the initiating member to the receiving member;
generate a member access code, upon confirmed membership registration, to identify a member, and by which the member optionally elects to whom the member may provide the generated member access code;
assign the member access code to a specific user data report; provide the member access code assigned to the specific user data report and transmit the member access code to the initiating member, for subsequent delivery from the initiating member to the receiving member;
execute an option of the receiving member to retrieve and capture the specific user data report of the initiating member;
validating the identity of the receiving member, if the receiving member so elects to retrieve and capture the specific user data report of the initiating member;
execute, if the authenticity of the receiving member is confirmed, the option of the receiving member to retrieve and capture the specific user data report of the initiating member;
pair the specific user data report with the member access code;
transmit to the receiving member the member access code to the specific user data report with instructions to enter the member access code and a user name of the receiving member into the user interface;
process the request from the receiving member to retrieve and capture the specific user data report of the initiating member; and
transmit to the receiving member the specific user data report from the initiating member.

10. The computer readable storage medium of claim 9, wherein the programming is further configured to:
locate a personal data file of the initiating member from a module within the secure database server; and
authenticate a first member status of the initiating member.

11. The computer readable storage medium of claim 9, wherein the programming is further configured to:
locate a personal data file of the receiving member from a module within the secure database server; and
validate the identity of a second member status by the receiving member.

12. The computer readable storage medium of claim 9, wherein the programming is further configured to:
display to the initiating member a plurality of options through the user interface with activation buttons to actuate the secure the transfer of personal proprietary information to the receiving member.

13. The computer readable storage medium of claim 9, wherein the programming is further configured to:
display to the receiving member a plurality of options through the user interface regarding the secure receipt of personal proprietary information from the initiating member.

14. The computer readable storage medium of claim 9, wherein the programming is further configured to:
validate member payment information for the initiating member;
determine if payment is by a new member or a renewing existing member; and
update the membership database.

15. The computer readable storage medium of claim 9, wherein the programming is further configured to:
validate member payment information for the receiving member;
determine if payment is by a new member or a renewing existing member; and
update the membership database.

16. The computer readable storage medium of claim 9, wherein the programming is further configured to:
generate a progressive code access key, the progressive code access key defined by a progressive code access key database module of the secure database server; and
assign the generated progressive code access key to the specific user data report.

17. A system for implementing a system for managing the utilization of personal proprietary information in social media, the system comprising:
a user interface through which members access the system across a network and for managing the utilization of personal proprietary information in social media;
a secure database server consisting of a plurality of database modules for the storage of proprietary information within the databases modules containing personal and private information available for voluntary release by every user in a membership capacity with other members;

wherein the system is configured to:

provide a user interface through which members access the system across a network and for managing the utilization of personal proprietary information in social media;

provide a secure database server consisting of a plurality of database modules for the storage of proprietary information within the databases modules containing personal and private information available for voluntary release by every user in a membership capacity with other members;

execute, by an initiating member, a request to release and send a data report containing personal and private information of the initiating member to the receiving member;

generate a member access code, upon confirmed membership registration, to identify a member, and by which the member optionally elects to whom the member may provide the generated member access code;

assign the member access code to a specific user data report;

provide the member access code assigned to the specific user data report and transmit the member access code to the initiating member, for subsequent delivery from the initiating member to the receiving member;

execute an option of the receiving member to retrieve and capture the specific user data report of the initiating member;

validating the identity of the receiving member, if the receiving member so elects to retrieve and capture the specific user data report of the initiating member;

execute, if the authenticity of the receiving member is confirmed, the option of the receiving member to retrieve and capture the specific user data report of the initiating member;

pair the specific user data report with the member access code;

transmit to the receiving member the member access code to the specific user data report with instructions to enter the member access code and a user name of the receiving member into the user interface;

process the request from the receiving member to retrieve and capture the specific user data report of the initiating member; and transmit to the receiving member the specific user data report from the initiating member.

18. The system of claim 17, wherein the system is further configured to:

locate a personal data file of the initiating member from a module within the secure database server;

authenticate a first member status of the initiating member;

locate a personal data file of the receiving member from a module within the secure database server; and validate the identity of a second member status by the receiving member.

19. The system of claim 17, wherein the system is further configured to:

display to the initiating member a plurality of options through the user interface with activation buttons to actuate the secure the transfer of personal proprietary information to the receiving member;

display to the receiving member a plurality of options through the user interface regarding the secure receipt of personal proprietary information from the initiating member;

validate member payment information for the initiating member;

determine if payment is by a new member or a renewing existing member; and update the membership database;

validate member payment information for the receiving member;

determine if payment is by a new member or a renewing existing member; and update the membership database.

20. The system of claim 17, wherein the system is further configured to:

generate a progressive code access key, the progressive code access key defined by a progressive code access key database module of the secure database server; and assign the generated progressive code access key to the specific user data report.

* * * * *